United States Patent
LeComec

[19]

[11] Patent Number: 6,128,726
[45] Date of Patent: Oct. 3, 2000

[54] ACCURATE HIGH SPEED DIGITAL SIGNAL PROCESSOR

[75] Inventor: Yann LeComec, Fremont, Calif.

[73] Assignee: Sigma Designs, Inc., Fremont, Calif.

[21] Appl. No.: 08/657,555

[22] Filed: Jun. 4, 1996

[51] Int. Cl.[7] .................................................. G06F 15/00
[52] U.S. Cl. ........................... 712/221; 712/24; 712/210; 712/212; 712/220; 708/204; 708/505; 708/632
[58] Field of Search ................................ 712/1, 2, 9, 24, 712/205, 206, 210, 212, 220, 221; 708/204, 523, 497, 632, 505, 503

[56] References Cited

U.S. PATENT DOCUMENTS

| | | | |
|---|---|---|---|
| 3,846,762 | 11/1974 | Gregory et al. | 340/172.5 |
| 3,908,080 | 9/1975 | Broadbent | 178/6.6 R |
| 3,947,826 | 3/1976 | Bockwoldt | 340/173 |
| 4,353,057 | 10/1982 | Bernet et al. | 340/347 |
| 4,394,650 | 7/1983 | Long et al. | 340/728 |
| 4,425,581 | 1/1984 | Schweppe et al. | 358/148 |
| 4,498,098 | 2/1985 | Stell | 358/22 |
| 4,523,227 | 6/1985 | Hurst | 358/105 |
| 4,528,561 | 7/1985 | Kitamura | 340/745 |
| 4,580,165 | 4/1986 | Patton et al. | 358/148 |
| 4,587,633 | 5/1986 | Wang et al. | 364/900 |
| 4,626,837 | 12/1986 | Priestly | 340/723 |
| 4,628,479 | 12/1986 | Borg et al. | 364/900 |
| 4,675,612 | 6/1987 | Adams et al. | 328/63 |
| 4,680,622 | 7/1987 | Barnes et al. | 358/22 |
| 4,684,936 | 8/1987 | Brown et al. | 340/721 |
| 4,713,621 | 12/1987 | Nakamura et al. | 328/55 |
| 4,757,310 | 7/1988 | Katsura et al. | 340/798 |
| 4,779,210 | 10/1988 | Katsura et al. | 364/521 |
| 4,811,205 | 3/1989 | Normington et al. | 364/900 |
| 4,814,879 | 3/1989 | McNeely | 358/148 |
| 4,823,260 | 4/1989 | Imel et al. | 395/563 |
| 4,862,392 | 8/1989 | Steiner | 364/522 |
| 4,870,406 | 9/1989 | Gupta et al. | 340/70 |
| 4,876,600 | 10/1989 | Pietzsch et al. | 358/183 |
| 4,876,660 | 10/1989 | Owen et al. | 364/750.5 |
| 4,891,631 | 1/1990 | Fredlund et al. | 340/709 |
| 4,905,189 | 2/1990 | Brunolli | 364/900 |

(List continued on next page.)

FOREIGN PATENT DOCUMENTS

| | | | |
|---|---|---|---|
| 0 384 257 | 8/1990 | European Pat. Off. | G09G 1/16 |
| 0 384 419 | 8/1990 | European Pat. Off. | G09G 1/16 |
| 1175374 | 11/1989 | Japan | H04N 5/265 |

*Primary Examiner*—John A. Follansbee
*Assistant Examiner*—Dzung C. Nguyen
*Attorney, Agent, or Firm*—Swernofsky Law Group

[57] ABSTRACT

An improved digital signal processor, in which arithmetic multiply-add instructions are performed faster with substantial accuracy. The digital signal processor performs multiply-add instructions with look-ahead rounding, so that rounding after repeated arithmetic operations proceeds much more rapidly. The digital signal processor is also augmented with additional instruction formats which are particularly useful for digital signal processing. A first additional instruction format allows the digital signal processor to incorporate a small constant immediately into an instruction, such as to add a small constant value to a register value, or to multiply a register by a small constant value; this allows the digital signal processor to conduct the arithmetic operation with only one memory lookup instead of two. A second additional instruction format allows the digital signal processor to loop back to a location relatively addressed from the looping instructions; this allows the digital signal processor to conduct the loop operation with only one memory lookup instead of two.

5 Claims, 3 Drawing Sheets

U.S. PATENT DOCUMENTS

| | | | |
|---|---|---|---|
| 4,907,086 | 3/1990 | Truong | 358/183 |
| 4,916,301 | 4/1990 | Mansfield et al. | 340/747 |
| 4,947,257 | 8/1990 | Fernandez et al. | 358/183 |
| 4,947,342 | 8/1990 | Katsura et al. | 364/518 |
| 4,951,229 | 8/1990 | DiNicola et al. | 364/521 |
| 4,953,101 | 8/1990 | Kelleher et al. | 364/518 |
| 4,994,912 | 2/1991 | Lumelsky et al. | 358/140 |
| 5,010,508 | 4/1991 | Sit et al. | 364/748 |
| 5,027,212 | 6/1991 | Marlton et al. | 358/183 |
| 5,046,023 | 9/1991 | Katsura et al. | 364/518 |
| 5,065,346 | 11/1991 | Kawai et al. | 395/128 |
| 5,097,257 | 3/1992 | Clough et al. | 340/814 |
| 5,099,331 | 3/1992 | Truong | 358/183 |
| 5,111,292 | 5/1992 | Kuriacose et al. | 358/133 |
| 5,111,409 | 5/1992 | Gasper et al. | 395/152 |
| 5,122,875 | 6/1992 | Raychaudhuri et al. | 358/133 |
| 5,138,307 | 8/1992 | Tatsumi | 340/721 |
| 5,151,875 | 9/1992 | Sato | 364/784 |
| 5,157,716 | 10/1992 | Naddor et al. | 379/92 |
| 5,168,356 | 12/1992 | Acompora et al. | 358/133 |
| 5,185,665 | 2/1993 | Okura et al. | 358/183 |
| 5,191,410 | 3/1993 | McCalley et al. | 358/86 |
| 5,191,548 | 3/1993 | Balkanski et al. | 364/725 |
| 5,195,051 | 3/1993 | Palaniswami | 364/748 |
| 5,196,946 | 3/1993 | Balkanski et al. | 358/433 |
| 5,204,828 | 4/1993 | Kohn | 364/736 |
| 5,208,745 | 5/1993 | Quentin et al. | 364/188 |
| 5,218,431 | 6/1993 | Gleicher et al. | 358/13 |
| 5,220,312 | 6/1993 | Lumelsky et al. | 340/721 |
| 5,231,492 | 7/1993 | Dangi et al. | 358/143 |
| 5,235,533 | 8/1993 | Sweedler | 364/175.03 |
| 5,243,447 | 9/1993 | Bodenkamp et al. | 345/133 |
| 5,253,078 | 10/1993 | Balkanski et al. | 358/426 |
| 5,258,943 | 11/1993 | Gamez et al. | 364/745 |
| 5,270,832 | 12/1993 | Balkanski et al. | 358/432 |
| 5,289,276 | 2/1994 | Siracusa et al. | 348/467 |
| 5,309,111 | 5/1994 | McNeely et al. | 328/133 |
| 5,309,567 | 5/1994 | Mizukami | 395/325 |
| 5,329,630 | 7/1994 | Baldwin | 395/425 |
| 5,333,261 | 7/1994 | Guttag et al. | 395/162 |
| 5,341,318 | 8/1994 | Balkanski et al. | 364/725 |
| 5,371,861 | 12/1994 | Keener et al. | 395/325 |
| 5,379,356 | 1/1995 | Purcell et al. | 382/56 |
| 5,392,239 | 2/1995 | Margulis et al. | 365/189.01 |
| 5,397,853 | 3/1995 | Koguchi | 84/609 |
| 5,402,147 | 3/1995 | Chen et al. | 345/115 |
| 5,406,306 | 4/1995 | Siann et al. | 345/115 |
| 5,416,749 | 5/1995 | Lai | 365/240 |
| 5,426,756 | 6/1995 | Shyi et al. | 395/425 |
| 5,434,913 | 7/1995 | Tung et al. | 379/202 |
| 5,446,501 | 8/1995 | Takemoto et al. | 348/620 |
| 5,450,542 | 9/1995 | Lehman et al. | 395/162 |
| 5,450,544 | 9/1995 | Dixon et al. | 395/164 |
| 5,471,576 | 11/1995 | Yee | 395/154 |
| 5,522,085 | 5/1996 | Harrison et al. | 395/800 |
| 5,528,309 | 6/1996 | Nguyen | 348/587 |
| 5,657,262 | 8/1997 | Curtet | 364/736.02 |

ACCURATE HIGH SPEED DIGITAL SIGNAL PROCESSOR

BACKGROUND OF THE INVENTION

1. Field of the Invention

This invention relates to an improved digital signal processor.

2. Description of Related Art

A digital signal processor (DSP) performs computations which generally require large numbers of arithmetic operations to be performed rapidly. Because it is desirable for arithmetic operations to be performed as rapidly as possible, it is desirable to find ways for the DSP use fewer processor cycles to perform a given set of arithmetic operations, or to perform more arithmetic operations in a given number of processor cycles.

One operation which is often performed by a digital signal processor is to multiply two numbers together and add the product to an accumulating sum. This operation is particularly important for audio and video applications, such as for example in computing vector dot products. In audio and video applications, it is desirable to perform many such operations at high speed and with substantial accuracy.

Accordingly, it would be advantageous to provide a digital signal processor which can perform certain arithmetic operations at high speed and with substantial accuracy.

SUMMARY OF THE INVENTION

The invention provides an improved digital signal processor, in which arithmetic multiply-add instructions are performed faster with substantial accuracy. In a preferred embodiment, the digital signal processor performs multiply-add instructions with look-ahead rounding, so that rounding after repeated arithmetic operations proceeds much more rapidly.

In a preferred embodiment, the digital signal processor is also augmented with additional instruction formats which are particularly useful for digital signal processing. A first additional instruction format allows the digital signal processor to incorporate a small constant immediately into an instruction, such as to add a small constant value to a register value, or to multiply a register by a small constant value; this allows the digital signal processor to conduct the arithmetic operation with only one memory lookup instead of two. A second additional instruction format allows the digital signal processor to loop back to a location relatively addressed from the looping instructions; this allows the digital signal processor to conduct the loop operation with only one memory lookup instead of two.

DESCRIPTION OF THE PREFERRED EMBODIMENT

In the following description, a preferred embodiment of the invention is described with regard to preferred process steps and data structures. However, those skilled in the art would recognize, after perusal of this application, that embodiments of the invention may be implemented using a set of general purpose computers operating under program control, and that modification of a set of general purpose computers to implement the process steps and data structures described herein would not require undue invention.

LOOK-AHEAD ROUNDING OF ARITHMETIC OPERATIONS

Figure 1A:
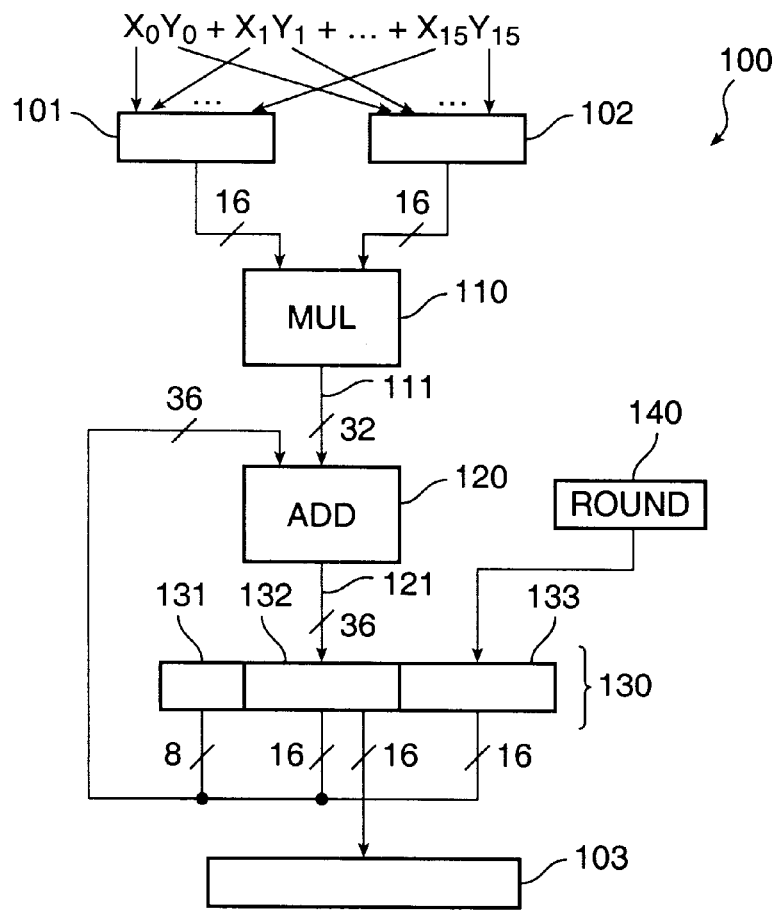
FIG. 1A shows a block diagram of an arrangement for look-ahead rounding for arithmetic operations.

FIG. 1A shows a block diagram of an arrangement for look-ahead rounding for arithmetic operations.

An arrangement 100 for look-ahead rounding for arithmetic operations comprises a first input port 101 for a first input data value, a second input port 102 for a second input data value, and an output port 103 for an output data value.

In a preferred embodiment, the first input port 101 is 16 bits wide and the first data value is interpreted in two's-complement integer notation; thus the first data value may range from $-32,768$ (i.e., $-2^{16}$) to $+32,767$ (i.e., $2^{16}-1$). The second input port 101 is similarly 16 bits wide and the second data value is similarly interpreted in two's-complement integer notation.

The first input port 101 and the second input port 102 are coupled to respective inputs of a multiplier 110, which multiplies the two values and produces a 32 bit data value on a product bus 111.

The product bus 111 is coupled to a first input of an adder 120. The adder 120 produces a 40 bit output on a sum bus 121, which is coupled to an accumulator register 130.

The accumulator register 130 is divided into a most significant portion 131, a middle portion 132, and a least significant portion 133. In a preferred embodiment, the most significant portion 131 is 8 bits wide, i.e., bit 35 through bit 32 inclusive, the middle portion 132 is 16 bits wide, i.e., bit 31 through bit 16 inclusive, and the least significant portion 133 is 16 bits wide, i.e., bit 15 through bit 0 inclusive. Thus, the accumulator register 130 is 40 bits wide. All three portions of the accumulator register 130 are fed back to the adder 120 at a second input thereof.

The middle portion 132 is coupled to the output port 103, which is also 16 bits wide; the output data value is interpreted in two's-complement integer notation.

When computing a dot product, the first input port 101 is coupled to a first sequence of 16 first input data values and the second input port 102 is coupled to a second sequence of 16 second input data values. After N multiply-add operations, the accumulator register 130 contains the sum of products for the first N pairs of data values. Thus, after 15 multiply-add operations, the accumulator register 130 contains the sum of products for the first 15 pairs of data values.

When the sequence of data values at the first input port 101 and the sequence of data values at the second input port 102 are scaled appropriately, data value in the register 103 comprises 16 bits of results at the middle portion 132, 16 bits of roundoff at the least significant portion 133, and 8 bits of saturation at the most significant portion 131.

The existence of roundoff implies that the results differ slightly from exact accuracy, in an amount which varies between $(-1)$ (LSB) and zero, where LSB is the value of the least significant bit of results, i.e., bit 16 of the accumulator register 130. Thus, the results which are coupled to the output port 103 may be inaccurate in the least significant bit.

To mitigate this inaccuracy, a rounding register 140 comprises a rounding value which is loaded into the accumulator register 130 before any multiply-add operations are performed. In a preferred embodiment, the rounding value is loaded into the accumulator register 130 before simultaneously with triggering operation of the multiplier 110, so there is no time delay for the operation of loading the accumulator register 130.

In a preferred embodiment, the rounding value comprises a value which represents (½) (LSB), where LSB is the value of the least significant bit of results. Thus, when using two's complement notation, the rounding value comprises "1000 0000 0000 0000" in binary, i.e., bit 15 of the rounding value is 1 and bit through bit 0 of the rounding value are 0.

When the look-ahead rounding value is pre-loaded into the accumulator register 130, the results still differ slightly from exact accuracy, but only in an amount which varies between (−½) (LSB) and almost (+½) (LSB). Thus, the results which are coupled to the output port 103 should be accurate in the least significant bit. There is only a tiny amount of bias toward the negative because the 16 bit value for roundoff at the least significant portion 133 varies between −(32,768)/(32,768) (i.e., negative 1), and +(32,767)/(32,768) (i.e., positive $1-2^{16}$).

In alternative embodiments, the rounding value may be adjusted to eliminate even this bias, such as by toggling bit 0 of the rounding value for alternate look-ahead rounding operations, or by supplying a random or pseudorandom value for bit 0 of the rounding value in successive look-ahead rounding operations.

Figure 1B:
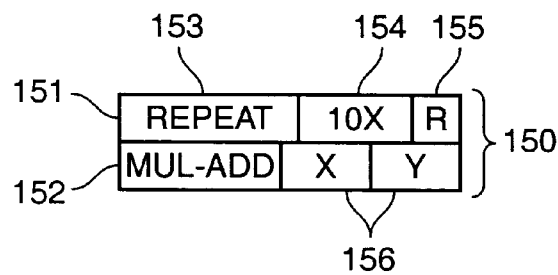
FIG. 1B shows a diagram of an instruction sequence for look-ahead rounding for arithmetic operations.

FIG. 1B shows a diagram of an instruction sequence for look-ahead rounding for arithmetic operations.

An instruction sequence 150 for computing a dot product of two vectors comprises a repeat instruction 151 and a multiply-add instruction 152. The repeat instruction 151 comprises an opcode field 153, count field 154, and a rounding field 155. The multiply-add instruction 152 comprises an opcode field 153 and two register fields 156.

The opcode field 153 designates the instruction type; it has a first value for the repeat instruction 151 and a second value for the multiply-add instruction 152.

The count field 154 designates how many times the multiply-add instruction 152 is to be performed.

The rounding field 155 designates whether look-ahead rounding is to be performed. In a preferred embodiment, the rounding field 155 comprises a single bit which designates whether the accumulator register 130 is to be pre-loaded with the rounding value.

The register fields 156 designate a first register which points to the first sequence of data values and a second register which points to the second sequence of data values. In a preferred embodiment, the registers are each incremented as the sequences of data values are loaded.

Figure 1C:
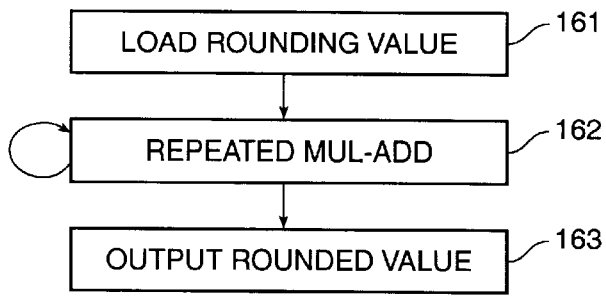
FIG. 1C shows a flow diagram of the method for look-ahead rounding for arithmetic operations.

FIG. 1C shows a flow diagram of the method for look-ahead rounding for arithmetic operations.

A method 160 for look-ahead rounding comprises the steps 161 through 163 inclusive.

At a step 161, the rounding value is loaded into the accumulator register 130.

At a step 162, the multiply-add operation is performed with a corresponding of data values. The step 162 is repeated N times if there are N pairs of data values, where N is preferably 16.

At a step 163, the middle portion 132 of the accumulator register 130 is output. There is no requirement for a separate rounding step and the output value may be directly coupled for downstream operation in the digital signal processor.

LOOP-RELATIVE INSTRUCTION FORMAT

Figure 2A:
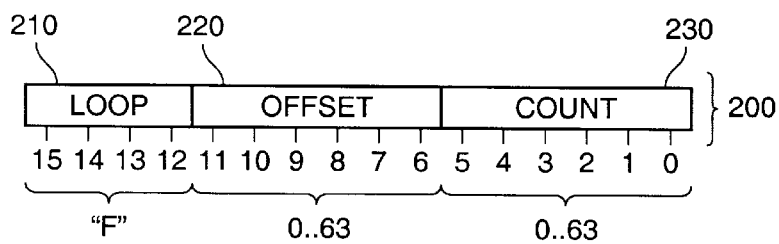
FIG. 2A shows a diagram of a loop-relative instruction format.

FIG. 2A shows a diagram of a loop-relative instruction format.

A loop-relative instruction 200 comprises a single instruction word having 16 bits, ordered from a most significant bit 15 to a least significant bit 0. The loop-relative instruction 200 comprises an opcode field 210, an offset field 220, and a count field 230.

The opcode field 210 of the loop-relative instruction 200 comprises bit 15 through bit 12 inclusive. One specific value of the opcode field 210, such as a hexadecimal "F", indicates that the instruction is a loop-relative instruction 200.

The offset field 220 of the loop-relative instruction comprises bit 11 through bit 6 inclusive. The offset field 220 designates an unsigned binary integer having a value from 0 to 63 inclusive. The offset field 220 represents an offset from the loop-relative instruction 200 to a final instruction of a program loop.

The count field 230 of the loop-relative instruction 200 comprises bit 5 through bit 0 inclusive. The count field 230 designates an unsigned binary integer having a value from 0 to 63 inclusive. The count field 230 represents a count of the number of times the digital signal processor will execute the program loop.

Figure 2B:
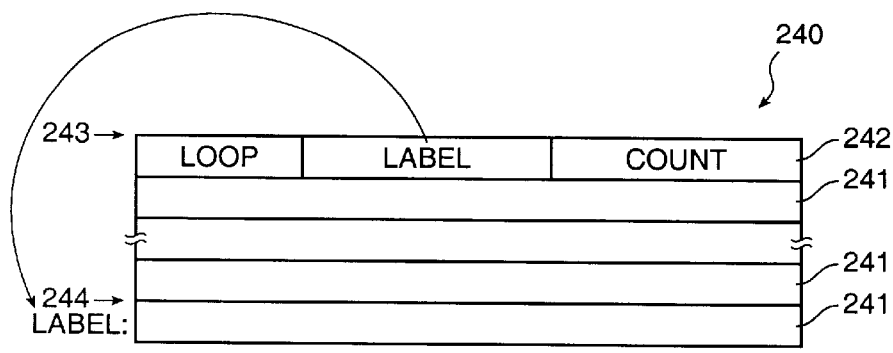
FIG. 2B shows a flow diagram for a method of interpretation of the loop-relative instruction format.

FIG. 2B shows a diagram of a program fragment employing the loop-relative instruction format.

A program loop 240 comprises a sequence of instructions 241, beginning with a loop instruction 242 at a loop-begin location 243, and ending at a loop-ending location 244. In alternative embodiments, the loop-ending location 244 may refer either to the last instruction to be executed as part of the loop, or to the first instruction to be executed after the loop is completed.

The opcode field 210 of the loop-relative instruction 200 indicates that the program fragment 240 comprises a loop.

The offset field 220 of the loop-relative instruction 200 indicates the relative offset of the loop-ending location 244 from the loop-begin location 243, i.e., the length of the program fragment 240 in bytes or instruction words.

The count field 230 of the loop-relative instruction 200 indicates the number of times the program fragment 240 is to be executed.

Figure 2C:
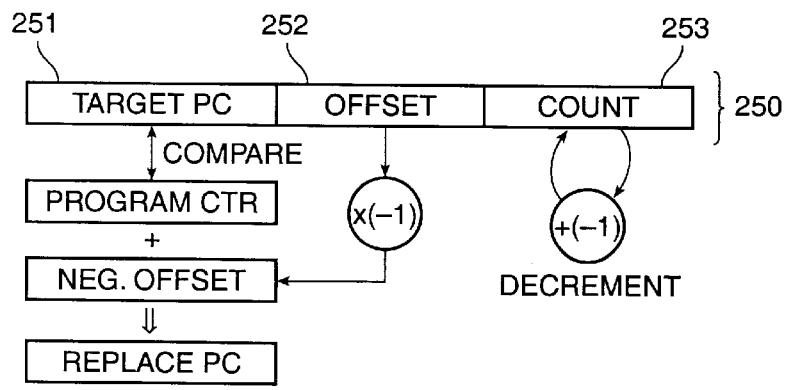
FIG. 2C shows a diagram of a program fragment employing the loop-relative instruction format.

FIG. 2C shows a flow diagram for a method of interpretation of the loop-relative instruction format.

When the digital signal processor recognizes a loop-relative instruction 200, it notes the loop-begin location 243 (i.e., the program counter for the location at which the loop-relative instruction 200 was found), and records three items of information in a loop register 250.

First, the digital signal processor determines the loop-ending location 244, i.e., the program counter for the location at which the loop ends. The digital signal processor determines the loop-ending location 244 by simply adding the value for the offset field 230 to the value for the loop-begin location 243. The digital signal processor records this value in a target program counter field 251 of the loop register 250.

Second, the digital signal processor determines an offset from the loop-ending location 244 back to the loop-begin location 243. The digital signal processor determines the offset by simply using the value for the offset field 230. The digital signal processor records this value in an offset field 252 of the loop register 250.

Third, the digital signal processor determines a count of the number of times the loop should be executed. The digital signal processor determines the count by simply using the value for the count field 240. The digital signal processor records this value in a count field 253 of the loop register 250.

While executing the program fragment 240, as with executing other instructions, the digital signal processor maintains a program counter 260 which designates the specific instruction to be next executed. The digital signal processor updates the program counter 260 for each instruction. For each instruction in the program fragment 240, the digital signal processor compares the program counter 260 against the target program counter field 251 of the loop register 250.

Whenever the program counter 260 equals the target program counter field 251, normal incrementing of the program counter does not occur and the digital signal processor alters the flow of control so the next instruction is from the beginning of the program fragment 240. To perform this operation, the digital signal processor subtracts the offset value 252 of the loop register 250 to form a replacement program counter value, and replaces the program counter with than new value.

Each time this occurs, the digital signal processor decrements the count value, to indicate that the program fragment 240 has been executed one more time. When the count value reaches zero, the program fragment 240 has been executed the correct number of times, and normal flow of control, i.e., normal incrementing of the program counter occurs at the end of the program fragment 240.

SHORT-IMMEDIATE INSTRUCTION FORMAT

Figure 3A:
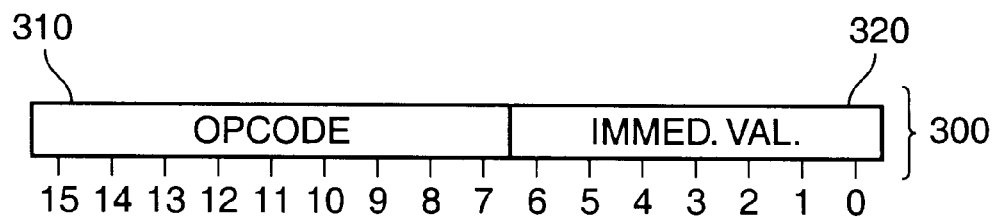
FIG. 3A shows a diagram of a short-immediate instruction format.

FIG. 3A shows a diagram of a short-immediate instruction format.

A short-immediate instruction 300 comprises a single instruction word having 16 bits, ordered from a most significant bit 15 to a least significant bit 0. The short-immediate instruction 300 comprises an opcode field 310 and an immediate field 320.

The opcode field 310 of the short-immediate instruction 300 comprises bit 16 through bit 8 inclusive. The opcode field 310 represents one of a set of arithmetic operations which may be performed on designated registers and a constant value designated by the immediate field 320.

For example, the arithmetic operation specified by the opcode field 310 may be an ADD operation, so that the constant value designated by the immediate field 320 is added to a designated register.

In a preferred embodiment, the designated registers are the registers A0 and A1 in a set of registers, the operation is performed on the value stored in register A1 and a result of the operation is stored in register A0. In alternative embodiments, other designated registers could be used, or the designated registers could be selected in response to the opcode field 310 or another field of the short-immediate instruction 300.

The immediate field 320 of the short-immediate instruction 300 comprises bit 6 through bit 0 inclusive. In a preferred embodiment, the immediate field 320 is coded to represent numeric values other than the binary value of those bits. In a preferred embodiment, these numeric values are optimized for values used in MPEG audio processing, but in alternative embodiments other sets of values, or values optimized for other processing tasks, may be used.

Table 3-1 shows the coding of the immediate field 320. In table 3-1, bit b0=bit 0, bit b1=bit 1, bit b2=bit 2, bit b3=bit 3, bit b4=bit 4, bit b5=bit 5, bit b6=bit 6, and bit b7=bit 7.

TABLE 3-1

| immediate field | coded value |
| --- | --- |
| 0 b5 b4 b3 b2 b1 b0 | positive value 0 through 63 inclusive, as represented by six bit value b5 b4 b3 b2 b1 b0 |
| 1 1 b4 b3 b2 b1 b0 | negative value −32 through −1 inclusive, as represented by five-bit value b4 b3 b2 b1 b0 |
| 1 0 0 b3 b2 b1 b0 | single one of 16 bits "1", all others "0", choice of single bit represented by the four-bit value b3 b2 b1 b0 |
| 1 0 1 b3 b2 b1 b0 | single one of 16 bits "0", all others "1", choice of single bit represented by the four-bit value b3 b2 b1 b0 |

Figure 3B:
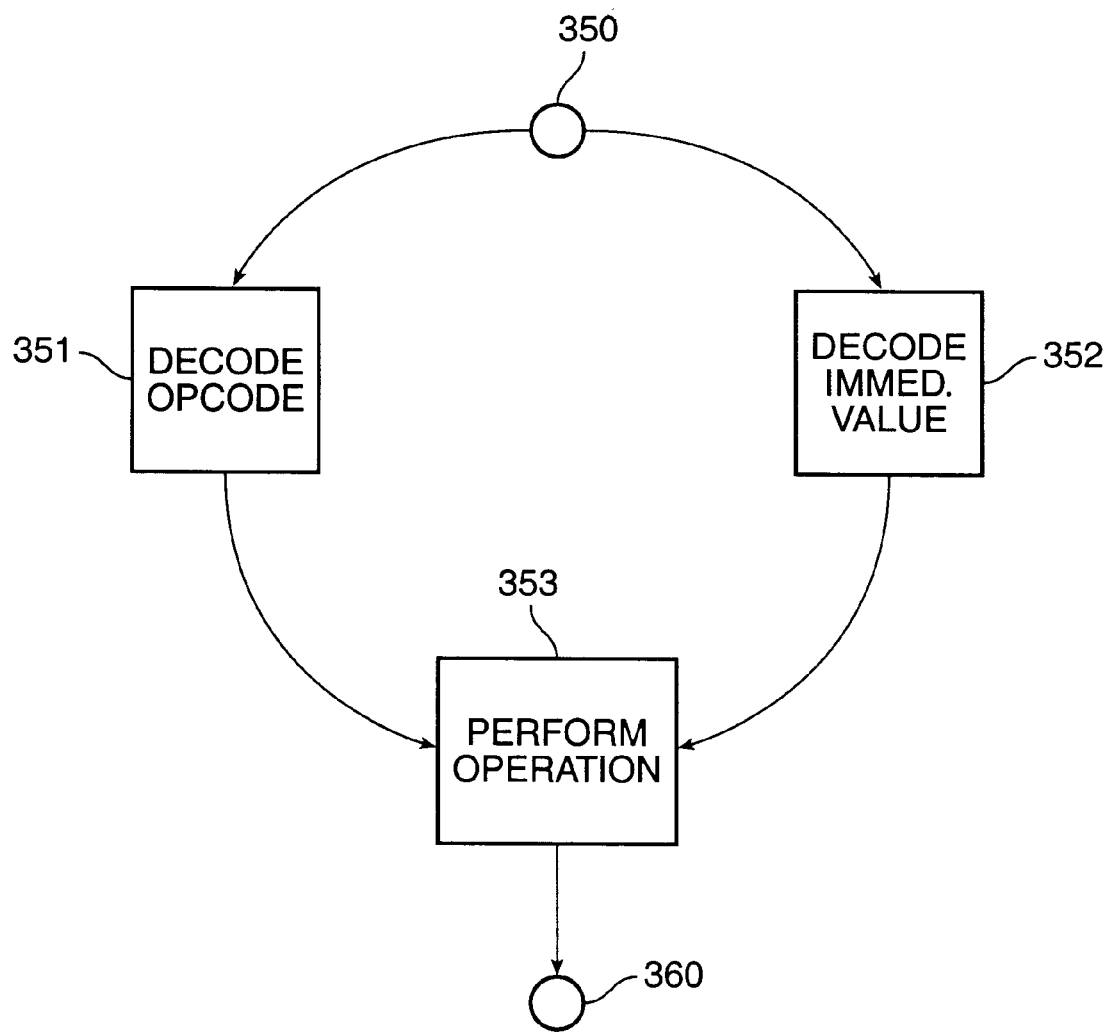
FIG. 3B shows a flow diagram for a method of interpretation of the short-immediate instruction format.

FIG. 3B shows a flow diagram for a method of interpretation of the short-immediate instruction format.

At a flow point 350, the digital signal processor fetches an instruction having the short-immediate instruction format, and is about to interpret that instruction.

At a step 351, the digital signal processor decodes the opcode field 310 and determines the operation to be performed.

At a step 352, performed in parallel with the step 351, the digital signal processor decodes the immediate field 320 and determines the constant with which the operation is to be performed.

At a step 353, performed after the step 351 and the step 352, the digital signal processor performs the operation determined by the opcode field 320 on the designated registers with the constant determined by the immediate field 330.

At a flow point 360 after the step 353, the instruction having the short-immediate format is complete.

Alternative Embodiments

Although preferred embodiments are disclosed herein, many variations are possible which remain within the concept, scope, and spirit of the invention, and these variations would become clear to those skilled in the art after perusal of this application.

I claim:

1. A digital signal processor, said digital signal processor having an instruction decoder coupled to an instruction memory for decoding a plurality of instructions fetched from said instruction memory, said digital signal processor being responsive to a short-immediate instruction word, said digital signal processor comprising an accumulator register coupled to an output of an arithmetic processing unit;

a rounding value coupled to said accumulator register;

means for loading said rounding value into said accumulator register substantially contemporaneously with starting an arithmetic operation of said arithmetic processing unit;

means in said instruction decoder for selecting an arithmetic operation to be performed responsive to an opcode field in said short immediate instruction word;

means in said instruction decoder for selecting an immediate constant as an operand for said arithmetic operation to be performed, said immediate constant being responsive only to an immediate field in said short-immediate instruction work, said immediate constant being substantially different from a binary value represented by said immediate field.

2. A digital signal processor having an instruction decoder coupled to an instruction memory for decoding a plurality of instructions fetched from the instruction memory, said digital signal processor being responsive to a short-immediate instruction word, said digital signal processor comprising means in said instruction decoder for selecting an arithmetic operation to be performed responsive to an opcode field in said short-immediate instruction word; means in said instruction decoder for selecting an immediate constant as an operand for said arithmetic operations to be performed, said immediate constant being responsive only to an immediate field in said short-immediate instruction work, said immediate constant being substantially different from a binary value represented by said immediate field, wherein said immediate field comprises a variable length first portion and a variable length second portion collectively comprising the entire immediate field;

wherein said immediate constant is substantially equal to a positive binary value represented by said second portion when said first portion has a first selected value;

wherein said immediate constant is substantially equal to a negative binary value represented by said second portion when said first portion has a second selected value;

wherein said immediate constant comprises a single bit having a first logic value and a plurality of bits having a second logical value, said single bit being selected in response to a binary value represented by said second portion when said first portion has a third selected value; and wherein said immediate constant comprises a single bit having said second logic value and a plurality of bits having said first logic value, said single bit being selected in response to a binary value represented by said second portion when said first portion has a fourth selected value.

3. A method of operating a digital signal processor, comprising the steps of coupling said digital signal processor to an instruction memory for decoding a plurality of instructions fetched from said instruction memory;

defining a short-immediate instruction word in said instruction memory;

selecting an arithmetic operation to be performed responsive to an opcode field in said short-immediate instruction word; and selecting an immediate constant as an operand for said arithmetic operation to be performed, said immediate constant being responsive only to an immediate field in said short immediate instruction work, said immediate constant being substantially different from a binary value represented by said immediate field;

wherein said immediate constant comprises a single bit having a first logic value and a plurality of bits having a second logic value, said single bit being selected in response to a binary value represented by a first portion of said immediate field when a second portion of said immediate field has a first selected value, and wherein said immediate constant comprises a single bit having a said second logic value and a plurality of bits having said first logic value, said single bit being selected in response to a binary value represented by said first portion of said immediate field when said second portion of said immediate field has a second selected value.

4. A method as in claim 3 wherein said immediate field comprises a variable-length first portion and a variable-length second portion, said first portion and second portion collectively comprising the entire immediate field;

wherein said immediate constant is substantially equal to a positive binary value represented by said second portion when said first portion has a first selected value;

wherein said immediate constant is substantially equal to a negative binary value represented by said second portion when said first portion has a second selected value;

wherein said immediate constant comprises a single bit having a first logic value and a plurality of bits having a second logic value, said single bit being selected in response to a binary value represented by said second portion when said first portion has a third selected value; and wherein said immediate constant comprises a single bit having said second logic value and a plurality of bits having said first logic value, said single bit being selected in response to a binary value represented by said second portion when said first portion has a fourth selected value.

5. A digital signal processor as in claim 1, said digital signal processor having an instruction decoder coupled to an instruction memory for decoding a plurality of instructions fetched from said instruction memory; said digital signal processor being responsive to a loop relative instruction work, said digital signal processor comprising means in said instruction decoder for defining a program fragment to be executed repeatedly, said means being responsive to an offset field in said loop-relative instruction word, said offset field representing a binary value substantially equal to a length of said program fragment;

means in said instruction decoder for defining a count of a number of times said program fragment is to be executed; and means in said digital signal processor for repeatedly executing said program fragment, said means being operative to adjust a program counter in said digital signal processor by said binary value.

* * * * *